(12) United States Patent
Caro et al.

(10) Patent No.: US 7,749,462 B2
(45) Date of Patent: Jul. 6, 2010

(54) PIPING

(75) Inventors: Colin G. Caro, London (GB); Philip L. Birch, Chiddingfold (GB); William Tallis, Warwickshire (GB)

(73) Assignee: Technip France S.A.S., Courbevoie (FR)

( * ) Notice: Subject to any disclaimer, the term of this patent is extended or adjusted under 35 U.S.C. 154(b) by 329 days.

(21) Appl. No.: 11/686,735

(22) Filed: Mar. 15, 2007

(65) Prior Publication Data

US 2008/0017550 A1 Jan. 24, 2008

Related U.S. Application Data

(63) Continuation of application No. PCT/GB2007/000849, filed on Mar. 12, 2007, and a continuation-in-part of application No. PCT/GB2005/003632, filed on Sep. 21, 2005.

(60) Provisional application No. 60/782,398, filed on Mar. 15, 2006.

(51) Int. Cl.
*B01J 8/04* (2006.01)
*B01J 19/00* (2006.01)

(52) U.S. Cl. .................. 422/196; 422/198; 422/200; 422/204; 422/193

(58) Field of Classification Search ............ 422/198, 422/200, 204, 196, 193
See application file for complete search history.

(56) References Cited

U.S. PATENT DOCUMENTS

| D16,763 | S |   | 6/1886 | Watson |   |
|---|---|---|---|---|---|
| 1,818,082 | A |   | 8/1931 | Mott |   |
| 1,913,417 | A |   | 6/1933 | Ulrich |   |
| 2,246,418 | A |   | 6/1941 | Ward |   |
| 2,663,321 | A |   | 12/1953 | Jantsch |   |
| 2,832,374 | A |   | 4/1958 | November |   |
| RE24,783 | E |   | 2/1960 | Humphrey |   |
| 3,117,821 | A |   | 1/1964 | Mylting |   |
| 3,227,525 | A |   | 1/1966 | Degeorges et al. |   |
| 3,606,780 | A |   | 9/1971 | Nagahara |   |
| 3,610,289 | A |   | 10/1971 | Moss et al. |   |
| 3,647,187 | A |   | 3/1972 | Dannewitz et al. |   |
| 3,713,784 | A |   | 1/1973 | Pohl et al. |   |
| 3,719,207 | A |   | 3/1973 | Takeda |   |
| 3,779,312 | A | * | 12/1973 | Withers et al. | ............... 165/184 |

(Continued)

FOREIGN PATENT DOCUMENTS

AU 77718/75 8/1976

(Continued)

OTHER PUBLICATIONS

International Search Report for International Application No. PCT/GB2005/003632, dated Dec. 5, 2005.

(Continued)

*Primary Examiner*—Walter D Griffin
*Assistant Examiner*—Lessanework Seifu
(74) *Attorney, Agent, or Firm*—Marshall, Gerstein & Borun LLP

(57) ABSTRACT

The invention relates to piping for use as a pyrolysis tube in a cracking furnace. The tube is formed such that it has at least one section whose centreline curves in three dimensions, to induce swirl flow in the tube. Preferably, the tube is formed as a helix, more preferably a low-amplitude helix.

13 Claims, 5 Drawing Sheets

U.S. PATENT DOCUMENTS

| | | | |
|---|---|---|---|
| 4,317,353 | A | 3/1982 | Geppelt et al. |
| 4,595,058 | A | 6/1986 | Nations |
| 4,827,074 | A | 5/1989 | Suwa et al. |
| 5,167,483 | A | 12/1992 | Gardiner |
| 5,553,976 | A | 9/1996 | Korsgaard |
| 5,711,744 | A | 1/1998 | Strawcutter et al. |
| 5,799,623 | A | 9/1998 | Born et al. |
| 6,039,754 | A | 3/2000 | Caro |
| 6,343,516 | B1 | 2/2002 | Marrelli |
| 6,399,031 | B1 | 6/2002 | Herrmann et al. |
| 6,419,885 | B1 | 7/2002 | Di Nicolantonio et al. |
| 6,481,492 | B1 | 11/2002 | Zhu et al. |
| 6,719,953 | B2 | 4/2004 | Di Nicolantonio et al. |
| 6,776,194 | B2 | 8/2004 | Houston et al. |
| 6,896,007 | B2 | 5/2005 | Cymbalisty |
| 6,997,214 | B2 | 2/2006 | Kuo |
| 7,114,524 | B2 | 10/2006 | Houston et al. |
| 2002/0043022 | A1 | 4/2002 | Warren |
| 2002/0179166 | A1 | 12/2002 | Houston et al. |
| 2002/0179494 | A1 | 12/2002 | Doerksen |
| 2004/0000350 | A1 | 1/2004 | Cymbalisty |
| 2004/0134557 | A1 | 7/2004 | Cymbalisty |
| 2005/0131263 | A1 | 6/2005 | Wolpert et al. |
| 2006/0102327 | A1 | 5/2006 | Inui et al. |

FOREIGN PATENT DOCUMENTS

| | | |
|---|---|---|
| DE | 100 42 768 | 3/2002 |
| EP | 0 305 799 | 3/1989 |
| EP | 0 712 711 | 5/1996 |
| EP | 1 127 557 | 8/2001 |
| EP | 1 396 291 A1 | 3/2004 |
| FR | 2 248 015 | 5/1975 |
| GB | 0 499 058 | 1/1939 |
| GB | 0 729 618 | 5/1955 |
| GB | 969796 | 9/1964 |
| GB | 2 192 966 | 1/1988 |
| JP | 57-027740 | 2/1982 |
| RU | 2 110 554 | 5/1998 |
| SU | 531 993 | 10/1976 |
| WO | WO-86/04951 | 8/1986 |
| WO | WO-92/11931 | 7/1992 |
| WO | WO-95/09585 | 4/1995 |
| WO | WO-97/28232 | 8/1997 |
| WO | WO-97/28637 | 8/1997 |
| WO | WO-98/53764 | 12/1998 |
| WO | WO-98/56872 | 12/1998 |
| WO | WO-00/38591 | 7/2000 |
| WO | WO-01/18406 A1 | 3/2001 |
| WO | WO-02/47576 | 6/2002 |
| WO | WO-02/070626 | 9/2002 |
| WO | WO-02/093063 | 11/2002 |
| WO | WO-02/093064 | 11/2002 |
| WO | WO-02/098325 | 12/2002 |
| WO | WO-03/069209 | 8/2003 |
| WO | WO-2004/083705 A1 | 9/2004 |
| WO | WO-2004/083706 A1 | 9/2004 |
| WO | WO-2005/075607 | 8/2005 |
| WO | WO-2006/018251 | 2/2006 |
| WO | WO-2006/032877 | 3/2006 |

OTHER PUBLICATIONS

Written Opinion for International Application No. PCT/GB2005/003632, dated Dec. 5, 2005.

Caro et al., "A Novel Approach to Ethylene Furnace Coil Design," 18th Annual Ethylene Producers' Conference, 13 pages (Apr. 23-27, 2006).

Caro et al., "A Novel Approach to Ethylene Furnace Coil Design," Presentation at the 18th Annual Ethylene Producers' Conference, 19 pages (Presented on Apr. 26, 2006).

European Search Report for Application No. 09 00 5580, dated May 13, 2009.

European Search Report for Application No. 09 00 1322, dated Jul. 3, 2009.

* cited by examiner

PIPING

CROSS-REFERENCE TO RELATED APPLICATIONS

This application is (1) a continuation-in-part application of international patent application no. PCT/GB2005/003632 entitled "Piping," which has an international filing date of Sep. 21, 2005, naming Colin G. Caro, Philip L. Birch, and William Tallis as inventors, and which is based on United Kingdom patent application no. GB 0420971.4, filed on Sep. 21, 2004; (2) a continuation application of international patent application no. PCT/GB2007/000849 entitled "Piping," which has an international filing date of Mar. 12, 2007, naming Colin G. Caro, Philip L. Birch, and William Tallis as inventors, and which is based on United Kingdom patent application no. GB 0604895.3, filed on Mar. 10, 2006; and (3) anon-provisional application claiming the benefit of priority of U.S. Provisional Patent Application No. 60/782,398 entitled "Piping," filed on Mar. 15, 2006, naming Colin G. Caro, Philip L. Birch, and William Tallis as inventors, the entire contents of each of which are hereby expressly incorporated herein by reference.

FIELD OF THE DISCLOSURE

The present invention relates to piping, and more particularly to piping for use in cracking furnaces. The piping may have a particular geometry. The invention also extends to various other uses of the piping with this particular geometry.

BACKGROUND

Cracking furnaces are used in particular in the production of ethylene. In the steam cracking process for ethylene, a hydrocarbon feedstock is diluted with steam, and then heated rapidly to a high temperature by passing it through tubes (usually referred to as "furnace coils") in a furnace. The high temperature decomposes the hydrocarbon feedstock. The output stream, containing a broad mixture of hydrocarbons from the pyrolysis reactions in the pyrolysis tubes plus unreacted components of feedstock, is then quenched to prevent recombination of the products. The cooled stream can then be processed through a series of distillation and other separation operations in which the various products of the cracking operation are separated.

Known cracking furnaces suffer from a number of problems. Because of the very low residence time of the feedstock and steam flowing through the tubes in the furnace (a few tenths of a second), the furnace and the tubes must be maintained at a very high temperature in order to achieve the necessary rapid heating to achieve pyrolysis. A large amount of fuel is thus required to fire the furnace.

Further, the very high temperature of the tubes in the furnace leads to the deposition of coke on the inside of the tubes. This coking is particularly unwelcome, as the presence of a layer of coke on the inside of the tube reduces heat transfer from the furnace to the feedstock, and so affects yield. It also increases the pressure drop in the pyrolysis tube, although this factor is generally considered to be less significant than the effect on heat transfer.

If coke deposition is sufficiently severe, it is normally necessary to take a furnace out of service periodically (typically every 20 to 60 days) to allow decoking of the tubes (such as by steam cleaning). Since each furnace represents a very large capital investment, it is desirable to keep such downtime to a minimum.

SUMMARY

According to the invention, there is provided a cracking furnace with at least one pyrolysis tube passing through the furnace, wherein the pyrolysis tube is formed such that it has at least one portion whose centreline curves in three dimensions.

It has been found that when fluid flows through a portion of pipe whose centreline curves in three dimensions, it "swirls" along the pipe (i.e. a component of its motion is around the centreline of the pipe). This "swirl flow" has a number of advantages over conventional flow.

With swirl flow, there is improved mixing over the cross-section of the pipe. In addition, as a result of this mixing, the velocity profile of the flow across the pipe is more uniform (or blunter) than it would be with flow in a conventional pipe, with the swirling fluid tending to act as a plunger, scouring the pipe walls. Further, the flow velocity near the wall of the pipe is increased in comparison to a straight pipe, giving a reduced boundary layer thickness which in itself improves heat transfer from the pipe walls to the fluid within the pipe.

The improved mixing is of particular relevance when applied to a pyrolysis tube in a furnace, as it provides considerable mass, momentum and heat transfer in fluid within the core of the flow, and between fluid at the walls of the tube and fluid within the core. Thus, there is improved heat transfer from the wall of the pyrolysis tube to the feedstock flowing therein. This improved heat transfer allows greater yields of end-product to be achieved, or would allow the same yields to be achieved for less furnace fuel consumption. This improved heat transfer also effectively increases the capacity of the furnace in circumstances where, as is frequently the case, heat transfer is the limiting factor on the capacity of the furnace.

Further, swirl flow can be reduce coking. The improved heat transfer mentioned above allows the pyrolysis reaction to be carried out with a lower pyrolysis tube wall temperature, and this reduced temperature will lead to reduced coking. In addition, the higher near-wall flow velocity reduces the chance of any coke being deposited (as the coke is more likely to be swept along by the swirl flow), and will also tend to remove any coke which has been deposited on the wall of the tube. As a decrease in coke deposition will increase the length of time for which the furnace can be used before requiring decoking, and thus increase the productivity of the furnace the use of swirl flow in the pyrolysis tube can be extremely significant.

Preferably the inside surface of the pyrolysis tube is substantially smooth, and may for example be coated with a low friction coating, such coatings being known as such. It is preferred to avoid surface features such as rifling, as this would lead to an increased length of the wetted perimeter and a consequent tendency for there to be increased flow resistance. It is known for conventional pyrolysis tubes (straight or curved in two dimensions only) to be provided with rifling and this can promote a swirl flow near to the inside surface of the tube. However this is a relatively localised, near wall effect, which leaves a flow at the core where there is very little if any cross-mixing. Therefore, the improved heat transfer benefit of the present invention is not obtained. In a straight or two dimensionally curved rifled tube the centre line is correspondingly straight or follows the two dimensional curve.

In a preferred form, the pyrolysis tube is formed such that it has at least one portion whose centreline is formed is a helix with plural turns. If the centreline of the tube is formed as a helix (which curves in three dimensions) with plural turns, then swirl flow will continue along the tube, and the advantages will continue to be obtained.

Swirl flow is quickly established in a tube section whose centreline curves in three dimensions. The benefits of swirl flow discussed above may in certain circumstances be achieved by a pyrolysis tube portion the centreline of which curves in three dimensions over a short distance. However, if the tube then reverts to a normal section with a straight centreline, the swirl flow will die away and be replaced with normal flow. Preferably therefore the majority of the pyrolysis tube as it passes through the furnace has a centreline curving in three dimensions. For example, more than 50 percent, preferably more than 75 percent, more preferably more than 90 percent, of the extent of the tube within the furnace may have a 3-D curved centreline.

The pyrolysis tube portion may be formed such that its helix angle is constant, and this may be desirable from the point of view of simplifying manufacture of the pyrolysis tube.

However, it is also possible for the curvature to vary along the length of the pyrolysis tube portion. For example, the tube portion may have a plurality of parts, each part having a different helical curvature. A variable curvature may be desirable as it enables the flow conditions to be varied along the tube. For example, it may be desirable for the flow conditions in the tube where it enters the furnace (where the feedstock is relatively cool and has not been cracked) to differ from the flow conditions where the tube exits the furnace (where the feedstock has been cracked and is relatively hot). Using a different curvature will allow the flow conditions to be varied.

A varying curvature also allows the pyrolysis tube portion to perform well across a wide range of flow conditions. Flow conditions may vary, for example based on the type of feedstock, with different types having different densities, viscosities and so forth. It would be possible to optimize the characteristics of the tube portion for a particular set of flow conditions, to achieve the best possible results; however, if the flow conditions were to vary from that particular set, the tube portion may perform sub-optimally. In contrast, if the curvature varies along the length of the tube portion, then it is likely that some region of it will perform well for a given set of flow conditions (even if other regions perform less well), and this should allow the tube portion to be used across a larger range of flow conditions. It is also possible for only part of the pyrolysis tube to have a curved centreline; for example, a "U" shaped pyrolysis tube could have one straight leg and one leg with a centreline curving in three dimensions, with the two legs being joined by a 2D bend.

Considering the centreline of the tube portion as a helical line, if the helix angle and helix amplitude are constant then the curvature is constant. If on the other hand the curvature is to be varied, then this can be achieved by a variation in the helix angle and/or a variation in the helix amplitude.

Of course, other characteristics of the tube portion, in addition to curvature, may vary along its length. These characteristics include the cross-sectional area of the tube portion, which may be constant or may vary, and its cross-sectional shape.

In this specification the amplitude of the helix refers to the extent of displacement from a mean position to a lateral extreme. So, in the case of the pyrolysis tubing portion having a helical centreline, the amplitude is one half of the full lateral width of the helical centreline.

It may be desired for the amplitude of the helix to be relatively large. For example, the amplitude may be greater than the internal diameter of the tube portion. However for reasons of compactness, the amplitude is preferably equal to or less than the internal diameter of the tube portion.

In a particularly preferred form, the tube portion is formed as a low-amplitude helix. By "low-amplitude helix", we mean that the portion is formed such that its centreline follows a substantially helical path, and that the amplitude of the helix is equal to or less than one half of the internal diameter of the section.

A tube formed as a low-amplitude helix in this manner is particularly advantageous, as it provides the advantages of swirl flow but does not take up a much greater volume than a straight tube, and so can be used in place of a straight tube. This is particularly helpful if the tubes are to be used in the refitting of an existing furnace with straight tubes, as the straight tubes can simply be replaced with low-amplitude helical tubes.

Piping having low-amplitude helical geometry of this type can be used in a large number of applications besides pyrolysis tubes in cracking furnaces, and several of these uses and the advantages which can be obtained by using low-amplitude helical geometry will be described later.

BRIEF DESCRIPTION OF THE DRAWINGS

A preferred embodiment of the invention will now be described by way of example only and with reference to the accompanying drawings, in which.

DETAILED DESCRIPTION

Figure 1:
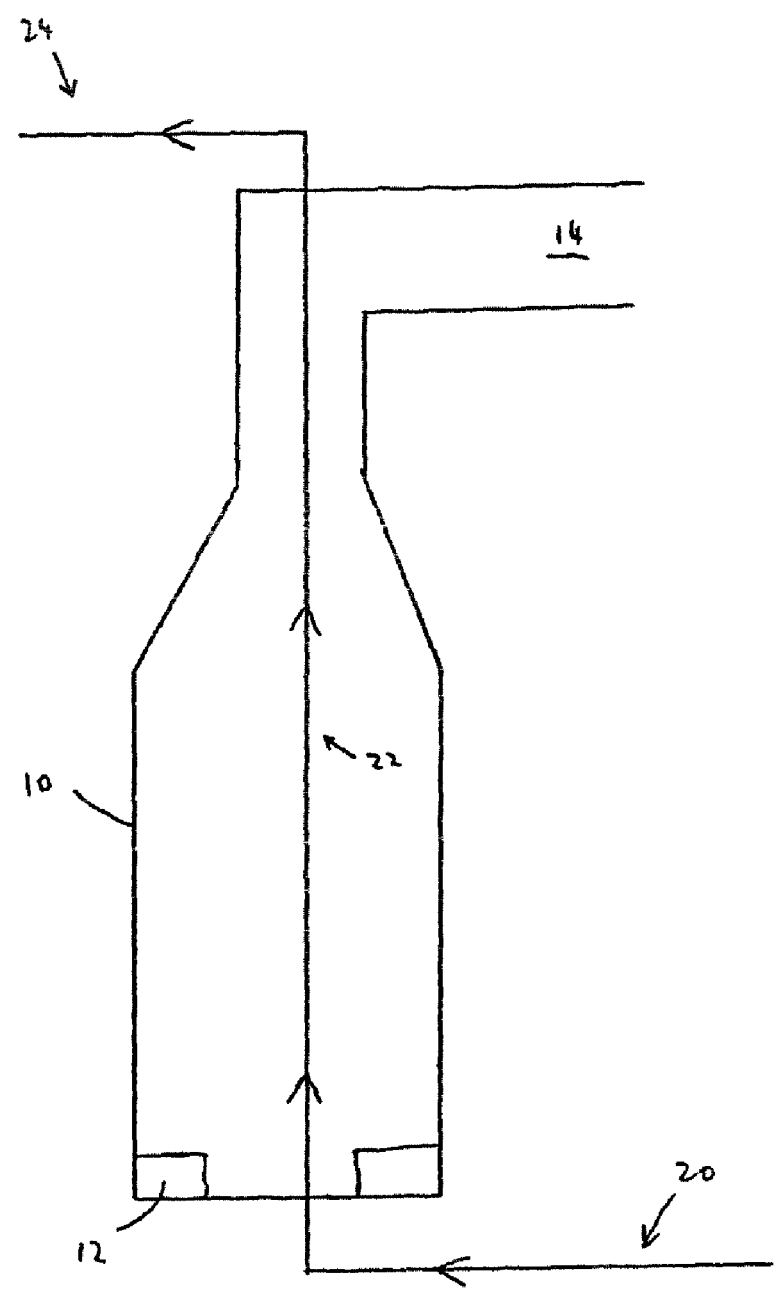
FIG. 1 is a schematic cross-sectional view of a prior art cracking furnace.

In FIG. 1, a prior art cracking furnace is indicated by the reference numeral 10. Burners 12 are disposed at the bottom of the furnace to heat it. Hot combustion products leave the furnace via chimney 14, and these may be used to preheat the feedstock and the steam used in the pyrolysis reaction.

A pyrolysis tube enters the furnace at its base (as indicated by reference numeral 20). The pyrolysis tube extends upwardly through the furnace (reference numeral 22), and in this part of the tube, the pyrolysis reaction takes place. The tube exits the furnace (reference numeral 24), and carries the products of the pyrolysis reaction and any unreacted feedstock to a quench apparatus.

The tube is formed as a generally straight pipe. The bends in the tube are simple planar elbow bends, where the centreline of the pipe curves in two dimensions only.

In practice, there will be a large number of pyrolysis tubes passing through the furnace; however, only a single tube has been shown for clarity purposes.

In some prior art arrangements the pyrolysis tube has a "U" or "M" or "W" configuration inside the furnace, and are known as U-coils, M-coils or W-coils. In all cases the bends forming the "U" or "M" or "W" shape are in a single plane.

Figure 2:
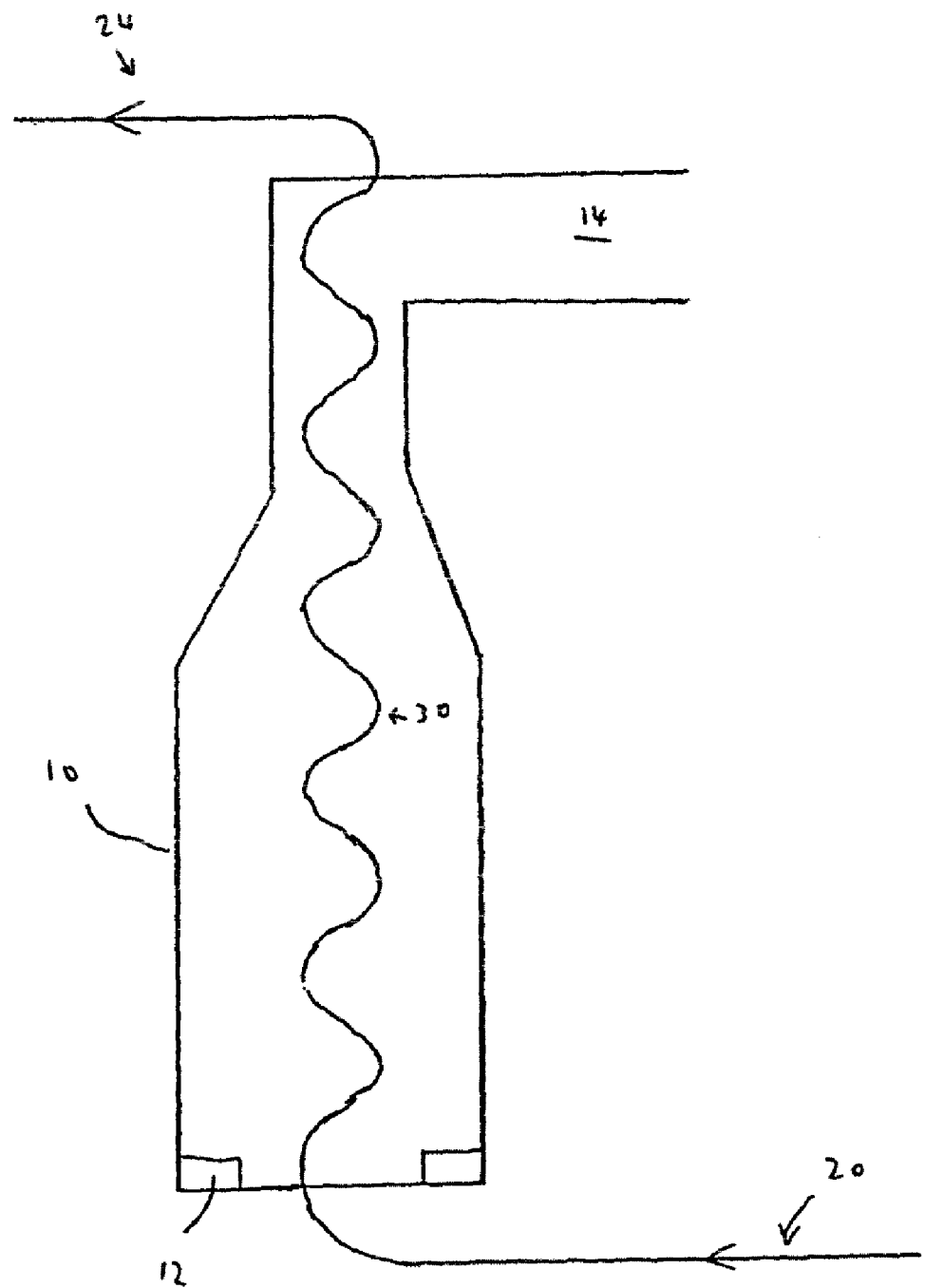
FIG. 2 is a schematic cross-sectional view of a cracking furnace according to a first embodiment of the invention.

FIG. 2 shows a furnace in accordance with an embodiment of the invention, with parts corresponding to those of the furnace of FIG. 1 having the same reference numerals. Again, only a single tube is shown for clarity purposes.

Here, the pyrolysis tube 30 is formed with a centreline curving in three dimensions. In particular, it is formed as a helix with a vertical axis extending from the bottom to the top of the furnace. (As the helix of the pyrolysis tube is shown in side view, it appears as a sine-wave shape.)

It will be appreciated that this is a schematic view, and that the pyrolysis tube may take various forms different from that shown in the Figure.

Because the pyrolysis tube 30 is formed with a centreline curving in three dimensions, the mixture of feedstock and steam in the pyrolysis tube will swirl as it flows along the pyrolysis tube. This will lead to improved mixing of the feedstock and the steam, and will also improve heat transfer from the walls of the pyrolysis tube into and through the mixture. Thus, the walls of the pyrolysis tube can be at a lower temperature than if the flow was not swirling, which allows lower burner fuel consumption. This lower wall temperature will also extend the life of the furnace tube and allow in some instances the use of cheaper alloys and tube manufacturing techniques to be used.

Further, the lower pyrolysis tube wall temperature and the increased near-wall flow velocity both reduce the amount of coke deposited on the walls of the pyrolysis tube, and any coke which is deposited is more likely to be removed from the walls of the tube as a result of the faster flow near the wall.

This reduction in coking is particularly advantageous, as it ensures that good heat transfer characteristics are maintained. It also reduces the need for the furnace to be taken out of action for decoking.

In FIG. 2, the section of the tube before it enters the furnace is shown as being straight; however, this section could also be formed with a centreline which curves in three dimensions, and this section could be helical along its length.

The helical section of the pyrolysis tube 30 in FIG. 2 is shown as being shaped rather like a coil spring. However, this makes the "envelope" of the pyrolysis tube relatively wide, and also considerably increases the length of the tube (and thus the residence time).

These features may be undesirable in some circumstances, and so it is preferred for the helical sections to be formed as a low amplitude helix, where the tube is formed such that its centreline follows a substantially helical path, and that the amplitude of the helix is equal to or less than one half of the internal diameter of the tube.

The term "amplitude of the helix" as used here refers to the extent of displacement of the centre line from a mean position to a lateral extreme. The amplitude is thus one half of the full lateral width of the helical centre line.

In a low-amplitude helical section of this type, where the amplitude of the helix is less than one half of the internal diameter of the tube, there is a "line of sight" along the lumen of the tube. Even though the flow at the line of sight could potentially follow a straight path, it has been found that it generally has a swirl component.

The "relative amplitude" of the helical section is defined as the amplitude divided by the internal diameter. Since the amplitude of the helical tube is less than or equal to one half of the internal diameter of the tube, this means that the relative amplitude is less than or equal to 0.5. Relative amplitudes less than or equal to 0.45, 0.40, 0.35, 0.30, 0.25, 0.20, 0.15, 0.1 or 0.05 may be preferred. Smaller relative amplitudes provide a better use of available lateral space, in that the tube is not much wider overall than a normal straight tube with the same cross-sectional area. Smaller relative amplitudes also result in a wider "line of sight", providing more space for the insertion of pressure gauges or other equipment along the tube (which may be useful when cleaning the tube). However, very small relative amplitudes can in some circumstances lead to reduced secondary motion and mixing.

With higher Reynolds numbers, smaller relative amplitudes may be used whilst swirl flow is induced to a satisfactory extent. This will generally mean that, for a given internal diameter, where there is a high flow rate a low relative amplitude can be used whilst still being sufficient to induce swirl flow.

The angle of the helix (or pitch, where the pitch is the length of one turn of the helix, and can be defined in terms of the internal diameter of the tube) is also a relevant factor in influencing the flow. As with relative amplitude, the helix angle may be optimized according to the conditions. The helix angle is preferably less than or equal to 65°, more preferably less than or equal to 55°, 45°, 35°, 25°, 20°, 15°, 10° or 5°.

Generally speaking, for higher Reynolds numbers the helix angle may be smaller whilst satisfactory swirl flow is achieved, whilst with lower Reynolds numbers a higher helix angle will be required to produce satisfactory swirl. In the case of a low amplitude helix, the use of higher helix angles for faster flows (with higher Reynolds numbers) will generally be undesirable, as there may be near wall pockets of stagnant fluid. Therefore, for a given Reynolds number (or range of Reynolds numbers), the helix angle will preferably be chosen to be as low as possible to produce satisfactory swirl. In certain embodiments, the helix angle is less than 20°.

Figure 3:
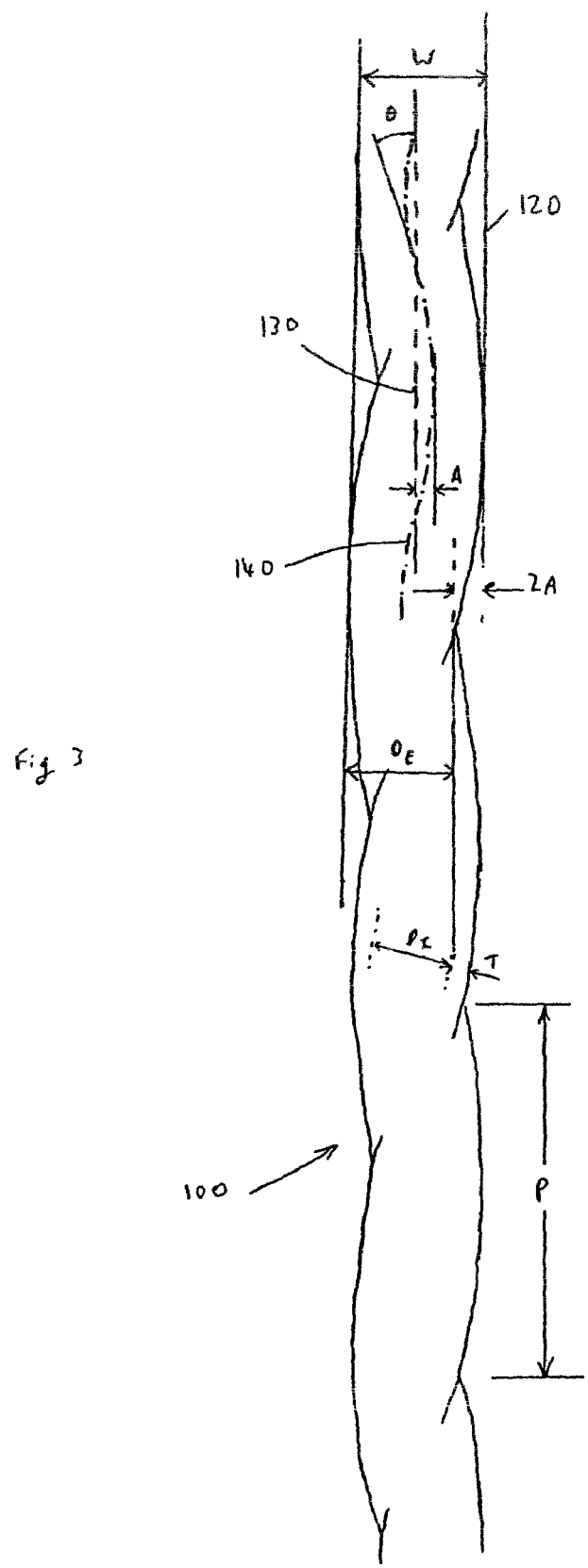
FIG. 3 is a view of a length of tubing having a low-amplitude helical geometry.

A length of tubing having a low-amplitude helical geometry is shown in FIG. 3. This tubing 100 has a circular cross-section, an external diameter $D_E$, an internal diameter $D_I$ and a wall thickness T. The tubing is coiled into a helix of constant amplitude A (as measured from mean to extreme), constant pitch P, constant helix angle θ and a swept width W. The tubing 1 is contained in an imaginary envelope 120 which extends longitudinally and has a width equal to the swept width W of the helix. The envelope 120 may be regarded as having a central longitudinal axis 130, which may also be referred to as an axis of helical rotation. The illustrated tubing 1 has a straight axis 130, but it will be appreciated that the central axis may be curved, or indeed may take any shape depending on requirements. The tubing has a centre line 140 which follows a helical path about the central longitudinal axis 130.

It will be seen that the amplitude A is less than half the tubing internal diameter $D_I$. By keeping the amplitude below this size, the lateral space occupied by the tubing and the overall length of the tubing can be kept relatively small, whilst at the same time the helical configuration of the tubing promotes swirl flow of fluid along the tubing. This also provides a relatively wide lumen along the tubing, which allows instruments, apparatus and the like to be passed down the tubing.

Figure 4:
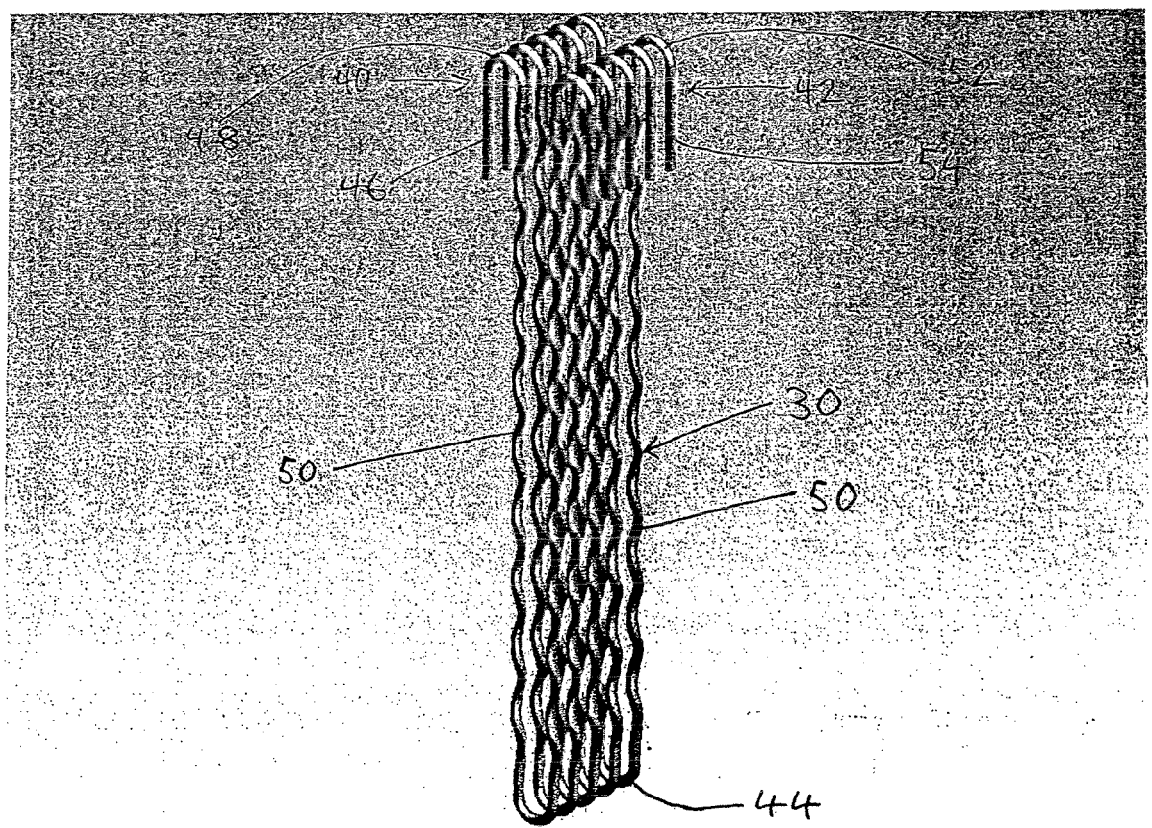
FIG. 4 is a view of a bank of pyrolysis tubes using low-amplitude helical geometry.

FIG. 4 shows a bank of pyrolysis tubes 30, all formed as low-amplitude helical tubes. It will be appreciated that in practice, the pyrolysis tubes will be formed as a bank in this way, to allow greater throughput with low residence times while still allowing sufficient heat transfer to the feedstock to allow pyrolysis to take place.

The pyrolysis tubes shown in FIG. 4 are of the "U" shaped type. Each tube has an inlet portion 40, an outlet portion 42 and a "U" bend portion 44, curved in two dimensions. The inlet portion 40 has a short section of straight tube 46, followed by a "U" bend section 48, also curved in two dimensions. This feeds into a three dimensionally curved portion 50 which is connected at its downstream end to the "U" bend portion 44. A second three dimensionally curved portion 50 carries the flow to the outlet portion 42, which has a "U" bend section 52 and then a short section of straight tube 54. The two dimensionally curved "U" bend sections 48, 52 and the "U"

bend portion 44 are curved in two dimension for manufacturing and installation convenience and this is not essential.

Figure 5A:
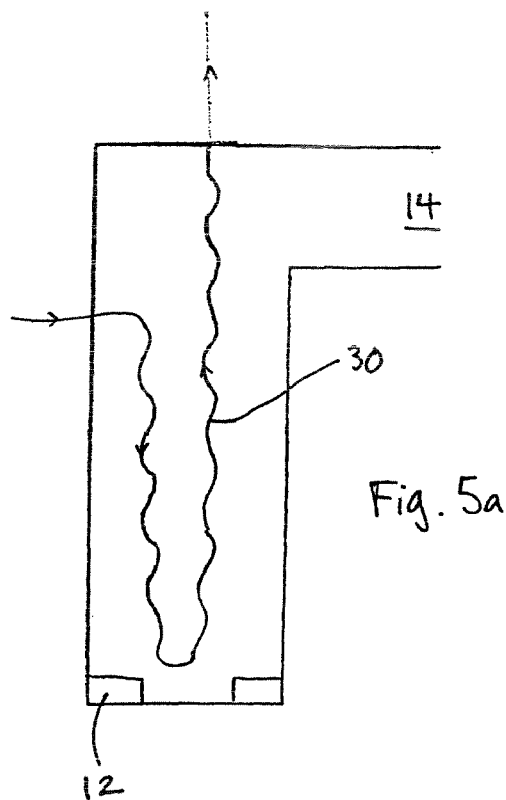
FIGS. 5a and 5b are schematic cross-sectional views of cracking furnaces using alternative layouts of low-amplitude helical geometry.
Figure 5B:
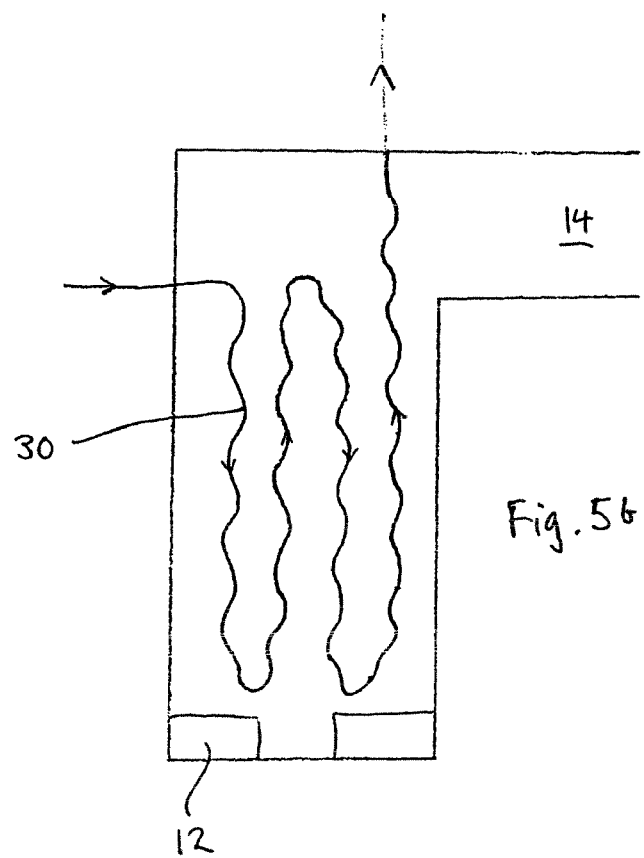

In FIG. 1, the pyrolysis tube enters the furnace at the bottom, and exits at the top. FIGS. 5a and 5b are schematic views of alternative arrangements of the pyrolysis tubes 30. In each case, the centrelines 140 (as described in relation to FIG. 3) are helical. In FIG. 5a, the pyrolysis tube enters towards the top of the furnace, extends downwards to the bottom, curves around, extends to the top of the furnace and exits. The tube is thus generally "U"-shaped. In this case the axis of helical rotation 130 described in relation to FIG. 3 would be "U"-shaped.

In FIG. 5b, rather than exiting immediately at the top of the furnace, the tube 30 makes another down-and-up loop, and exits at the top of the furnace. The tube is thus generally "W"-shaped. In this case the axis of helical rotation 130 described in relation to FIG. 3 would be "W"-shaped. Of course, the particular arrangement of the tube will depend on the specific requirements, and it will be appreciated that other shapes of pyrolysis tube, and other points of entry into and exit from the furnace, can be used depending on the particular requirements.

The use of low-amplitude helical geometry is not restricted to pyrolysis tubes in cracking furnaces.

Piping with low-amplitude helical geometry (which may have characteristics varying along its length) can also be used in a large number of processes involving the movement or transport of fluid through pipes, the mixing of fluids within pipes, heat and mass transfer into or out of fluid within pipes, processes where deposition or contamination takes place within pipes and processes where chemical reactions take place within pipes. This use is applicable to either gases or liquids as a single phase or to a mixture of gases, liquids or solids in any combination as a multiphase mixture. Use of such piping can have significant economic impact.

As an example, swirl flow can provide a reduction in turbulence and an associated reduced pressure drop, which will, under appropriate conditions, enable reduced pumping costs.

This can be significant in the distribution of hydrocarbons through pipelines, including the crude oil and gas production process. For example, petroleum production risers and flowlines for use either onshore or offshore can include at least one portion which has low-amplitude helical geometry. The low-amplitude helical geometry improves the flow dynamics in the riser of flowline, in that it reduces flow turbulence through the flowline or riser, and thus reduces pressure loss.

The flowline or riser may be substantially vertical, substantially horizontal, or have a curved geometry, including an S-shape or a catenary shape. The flowline or riser may be rigid or flexible, or any combination of the two. The flowline or riser may be constructed from any combination of materials, and may include strengthening rings.

Similarly, production tubing for downhole use within oil, gas, water, or geothermal wells can use low-amplitude helical geometry. At least one portion of a well will contain production tubing with low-amplitude helical geometry. The benefits will include a reduction of flow turbulence, and reduced pressure loss.

Further, pipelines for the transportation of hydrocarbon can use low-amplitude helical geometry, and will enjoy the benefits of reduced flow turbulence and reduced pressure loss. Of course, pipelines for the transportation of other fluids, such as potable water, waste water and sewerage, slurries, powders, food or beverage products, or indeed any single phase or multiphase fluids, can also have a low-amplitude helical geometry and enjoy the same benefits.

Another area where the reduced pressure drop is of particular benefit is in the context of penstocks and draft tubes for hydropower applications. Reduced pressure loss will lead to increased power generation output, and even a small reduction in pressure drop can lead to a very large increase in power output over the life of the plant.

A reduced pressure drop is also important in the distribution of steam around power stations and other industrial plant. It is also important for the operation of chemical reactions where the pressure needs to be maintained at the lowest possible level to improve yields, including processes operated under vacuum, such as the production of olefins by pyrolysis (as discussed in detail above) and the production of styrene from ethyl benzene.

Mixing within pipes is important in many industries including the chemical, food, pharmaceutical, water and oil industries. It is often important that a small amount of active chemical is uniformly distributed in a large mass of other material. In some instances this is known as dosing. Examples would be the addition of antioxidant to a variety of materials and foods, and the addition of chlorine or alkali to drinking water. The low-amplitude helix, because it delivers intrinsically good mixing, can reduce the amount of active chemical needed to ensure a sufficient concentration to achieve the desired purpose, and can ensure the absence locally of unacceptably high (or low) concentrations of additives.

Mixing is also important where it is required to bring together two or more large streams of fluids and ensure they do not remain separate. Mixing is furthermore important where it is beneficial to retain the fluid as a stable mixed phase (to prevent unwanted phase separation). This is important in the production of crude oil and gas, where the separation of gas creates slugging which reduces the capacity of pipelines and raises the expense of the operation. Indeed, a further major benefit of the use of low-amplitude helical geometry in petroleum production risers and flowlines, production tubing for downhole use, and pipelines for transportation of hydrocarbons and other fluids is the reduction of slug flow. The improved phase mixing is also significant in pipelines, as it tends to keep gas or air in the fluid, rather then having it collecting at the high points of the pipe and possibly causing airlocks.

Mixing is also important in the transport of solids by a liquid, as in the transport of sewage or the transport of minerals by pipeline in minerals extraction processes, to prevent the solids from settling out. This reduction of sedimentation (and of mineral and/or hydrocarbon precipitation) is also significant for petroleum production risers and flowlines, and production tubing for downhole use. Reduction of sedimentation is also important in hydropower applications. In addition, in petroleum production risers and flowlines, and production tubing for downhole use, the improved mixing reduces the risk of water drop-out.

As an example, static mixers for chemical dosing, and food, chemical, petrochemical and pharmaceutical processing, can use low-amplitude helical geometry. The benefits will include increased cross-mixing, and reduced blocking by sediment or precipitate. In addition, as discussed above, the low-amplitude helical geometry will also give a reduced mixer pressure-loss. Further, since there is a "line of sight" lumen along the low-amplitude helical portion, and there are no baffle plates or vanes as are commonly found in conventional mixers, there is increased ease of cleaning. These benefits will result in reduced maintenance and wear.

Further, the improved mixing (in particular thermal mixing) and reduced pressure loss which can be achieved using low-amplitude helical geometry is particularly beneficial in heat exchangers in power stations, refrigeration cold boxes, air separation cold boxes, and the like.

Low-amplitude helical piping can also be used to ensure complete mixing of components prior to reaction. This will ensure that reaction takes place more completely and that materials are used efficiently. Typically this would involve mixing gaseous or liquid reactants prior to passing them over a catalyst. However, it is specifically envisaged that this could be used for mixing fuel and air prior to passing them to an internal combustion engine. This would improve the efficiency of the internal combustion process and reduce the amount of unburnt or partially combusted fuel and fine solids passing to the atmosphere. This last improvement will also reduce the demand on and thus improve the performance of the catalytic converter downstream of internal combustion engines used in road transport.

Because the low-amplitude helical piping ensures helical (swirl) flow within pipes and generates a blunter velocity profile, the rate and uniformity of heat transfer to and from the fluid inside the pipe can be improved. In normal flow, the fluid at the centre of the pipe moves considerably faster than the fluid near the walls of the pipe, and so if the pipe is heated, the fluid near the walls will be heated to a greater degree than the fluid near the centre of the pipe.

However, as swirl flow has a blunter (and thus more uniform) velocity profile, it is less likely that parts of the fluid will be over- or under-heated, causing unwanted effects. The low-amplitude helical piping allows the same heat to be transferred with a lower differential temperature between the inside and the outside of the pipe.

This can be of particular benefit when a component is added to a fluid and treated in some way (such as heating). With poor mixing, the part of the mixture which is travelling quickly will be undertreated, and the part of the mixture which is travelling slowly will be overtreated; however, with the very good mixing provided by the low-amplitude helical geometry, this can be avoided, and more uniform treatment achieved.

This can be of serious economic benefit in furnaces such as olefin cracking furnaces, preheating furnaces for refinery thermal crackers or visbreakers, transfer line exchangers in olefin plants, heat exchangers in power stations, cold boxes for industrial refrigeration units, cold boxes for air separation units and refrigeration units generally.

The blunt velocity profile is also beneficial in hydropower applications. Turbines tend to work better when the velocity profile is blunter, and so use of the low-amplitude helical portions in hydropower applications can improve efficiency in this way. Additional advantages of swirl flow in the context of hydropower applications include reduced cavitation and reduced pipe stresses.

In addition, the "plunger" aspect of the swirl flow generated by the low-amplitude helical piping can provide significant economic benefits to those processes taking place in pipes where the deposition of fines or other solid particles on the inside wall of the pipe creates a barrier to heat transfer, or contaminates the fluid flowing through it, or reduces the flow of fluid through the pipe. Such fines or other solid particles can be present in the fluid, or can be created by a chemical reaction between the components of the fluid.

The use of low-amplitude helical piping is expected to significantly reduce such solid deposition on the internal walls of the pipe, thus extending its operating life before cleaning, reducing the amount of heat necessary, and reducing the pressure drop compared to the fouled pipe. Examples of where this effect could be economically significant are the transport of solids in liquid pipelines, and also the production of olefins by pyrolysis as discussed in detail above. A similar effect occurs in other furnaces such as the preheat furnaces for refinery processes.

Further, the blunt velocity profile and the "plunger" aspect is extremely useful in the context of batch processing, which is common in pharmaceutical and food processing. Because of the blunt velocity profile, the axial dispersion of batches can be reduced and the peak concentration achieved much earlier than for conventional arrangements. These features are particularly beneficial if the batch sizes are small. In addition, the "plunger flow" helps to remove traces of a first component from the pipe walls after switching to a second component, which helps reduce the chance of contamination in batch processing. The time required to wash out the system may at least be reduced along with the quantity of fluid required to perform the washing-out.

Using low-amplitude helical piping can also have material economic significance where chemical reactions take place in pipes or tubes. The combination of improved mixing and more uniform heat transfer will improve yields and encourage the completion of reactions (including combustion). Improving yields will also reduce downstream separation costs. Example processes where this would be important include olefin production and similar gas phase reactions, such as the cracking of toluene to form benzene, and conversion of butene-1 to butadiene. Where such reactions involve the production of more than one molecule of product for each molecule of feedstock, the lower pressure drop in the reactor and its downstream pipework which can be achieved through the use of low-amplitude helical piping provides an additional benefit from the lower average pressure, because it will reduce the possibility of the product molecules recombining to form the feedstock or other unwanted by-products. In addition, the use of low-amplitude helical geometry in reactors for chemical, petrochemical, and pharmaceutical applications, can lead to decreased deposition in the reactor tubes, which is of particular importance in the petrochemical industry.

The improved mixing and more uniform heat transfer will also encourage the completion of combustion reactions without a large amount of excess air (over that required by the stoichiometry of the reactions). This is particularly important for incinerators or waste disposal furnaces, where it is necessary to ensure complete reaction to prevent chemicals and/or particles deleterious to the environment and human health escaping into the atmosphere. This could be prevented and complete combustion ensured by passing the combustion gases, while still hot, through a section of piping formed as a low-amplitude helix before passing them to the atmosphere. The generation of swirling flow through the furnace will increase the rate and efficiency of combustion, and the removal of waste.

When used with flows that include two or more different phases, the low-amplitude helical portion can furthermore be used to separate "in line" a mixture of fluids having different densities. The swirling created by the helical flow tends to displace higher density components of the mixture towards the tube walls and lower density components towards the centreline, as a result of the centrifugal effect. By means of suitable arrangements, higher (or lower) density components can be drawn off, leaving the remaining component present in increased concentration. The process can be repeated using further similar in-line static separators. This separation can be used to remove gases from liquids, and can therefore be used to help reduce slugging in the petrochemical industry in particular.

An approach similar to this can be used to either increase or decrease the concentration of particles in a flowing fluid. This will be achieved by drawing off fluid either from the vicinity of the tube centreline or from near to the tube walls.

In addition, the swirl flow caused by the low-amplitude helical portion can be used to remove particulate matter from a flow. This is of particular importance in, for example, air intakes. Air intakes are used in a great many situations where air is required, and in particular on vehicles where air is required for combustion and/or cooling. Helicopter air intakes in particular usually need dust separators, to prevent dust reaching the engine, but the swirl flow generated by the low-amplitude helical geometry can be used to separate the dust from the airflow without the need for separate filters.

Further, it has been found that swirl flow caused by a low-amplitude helical portion continues for some distance in a straight pipe downstream of the section. Thus, a section of the low-amplitude helical piping can be inserted upstream of structures such as bends, T- or Y-junctions, manifolds, and/or changes of conduit cross-section, where the swirl flow generated by the low-amplitude helical portion would suppress flow separation, stagnation and flow instability, with benefit to pumping costs and corrosion and wear in pipes. The particular benefits of the swirling flow at the bend, junction or the like will be reduced flow separation, leading to reduced pressure loss, reduced sedimentation and precipitation, reduced cavitation, and increased flow stability. Low-amplitude helical geometry pipes positioned before bends will also reduce particulate erosion within pipe bends, which can be of particular benefit with regard to fuel feed to power stations.

It will thus be clear to the skilled person that piping with a low-amplitude helical geometry can provide many advantages in a large number of situations.

What is claimed is:

1. A cracking furnace with at least one pyrolysis tube passing through the furnace, the pyrolysis tube defining a flow passage with a cross-section that is substantially circular, wherein the flow passage of substantially circular cross-section has at least one pyrolysis tube portion having an internal diameter, the pyrolysis tube portion having a helical centerline that has an amplitude and curves in three dimensions, and wherein the amplitude of the helical centerline is less than or equal to the internal diameter of the pyrolysis tube portion.

2. A cracking furnace as claimed in claim 1, wherein the curvature of the centerline varies along the length of the pyrolysis tube portion.

3. A cracking furnace as claimed in claim 1, having a part with a helical curvature providing certain flow conditions where the tube enters the furnace, and a part with a helical curvature providing different flow conditions where the tube exits the furnace.

4. A cracking furnace as claimed in claim 1, wherein an inside surface of the pyrolysis tube portion is substantially smooth, with no surface features.

5. A cracking furnace as claimed in claim 1, wherein a cross-sectional area of the pyrolysis tube portion varies along the length thereof.

6. A cracking furnace as claimed in claim 1, wherein the pyrolysis tube has a portion with a straight centerline and a portion with a centerline that is helical.

7. A cracking furnace as claimed in claim 6, wherein the pyrolysis tube is "U" shaped, wherein the portion with a straight centerline is a straight leg of the pyrolysis tube, and wherein the portion with a helical centerline is another leg of the "U" shaped pyrolysis tube.

8. A cracking furnace as claimed in claim 7, wherein the legs of the pyrolysis tube are joined by a two-dimensional bent portion.

9. A cracking furnace as claimed in claim 1, wherein the amplitude of the helical centerline is less than or equal to one half of the internal diameter of the pyrolysis tube portion, so as to provide a line of sight along the flow passage defined by the pyrolysis tube portion.

10. A cracking furnace as claimed in claim 1, wherein the amplitude of the helical centerline is greater than or equal to one half of the internal diameter of the pyrolysis tube portion.

11. A cracking furnace as claimed in claim 10, wherein the helical centerline has a helix angle which is less than or equal to 20°.

12. A cracking furnace as claimed in claim 1, wherein the pyrolysis tube is supported where it enters the furnace and where it exits the furnace and is otherwise unsupported.

13. A cracking furnace with at least one pyrolysis tube passing through the furnace, the pyrolysis tube defining a flow passage with a cross-section that is substantially circular, wherein the flow passage of substantially circular cross-section has at least one pyrolysis tube portion having an internal diameter, the pyrolysis tube portion having a helical centerline that has an amplitude and curves in three dimensions, and wherein the amplitude of the helical centerline is less than or equal to the internal diameter of the pyrolysis tube portion, and wherein the helical centerline has a helix angle that is less than or equal to 45°.

* * * * *